United States Patent
Sakashita

(10) Patent No.: US 6,945,147 B2
(45) Date of Patent: Sep. 20, 2005

(54) CLAMPING DEVICE FOR MACHINE TOOLS

(75) Inventor: Yoshinori Sakashita, Yamatokoriyamashi (JP)

(73) Assignee: Mori Seiki Co., Ltd., Yamatokoriyama (JP)

(*) Notice: Subject to any disclaimer, the term of this patent is extended or adjusted under 35 U.S.C. 154(b) by 72 days.

(21) Appl. No.: 10/612,892

(22) Filed: Jul. 7, 2003

(65) Prior Publication Data

US 2004/0050222 A1 Mar. 18, 2004

(30) Foreign Application Priority Data

Jul. 4, 2002 (JP) .................................. 2002-195637

(51) Int. Cl.$^7$ .................................................. B23B 17/00
(52) U.S. Cl. ........................... 82/149; 82/154; 82/153; 409/241; 408/234
(58) Field of Search ..................... 82/149, 153, 154, 82/132, 137; 409/241, 235, 209; 408/234

(56) References Cited

U.S. PATENT DOCUMENTS

| | | | | |
|---|---|---|---|---|
| 3,526,938 A | * | 9/1970 | Grabher ..................... | 408/238 |
| 3,564,971 A | * | 2/1971 | Wagner et al. ............. | 409/212 |
| 3,600,987 A | * | 8/1971 | Kvasnicka ................. | 82/11.3 |
| 4,177,550 A | * | 12/1979 | Sipek et al. ............... | 409/183 |
| 4,792,267 A | * | 12/1988 | Warner ..................... | 409/235 |
| 5,943,928 A | * | 8/1999 | Oh ............................ | 82/137 |
| 6,021,560 A | | 2/2000 | Miyamoto et al. | |
| 6,189,427 B1 | * | 2/2001 | Kosho et al. .............. | 82/122 |
| 6,314,847 B1 | * | 11/2001 | Nakaminami et al. ..... | 82/117 |
| 6,349,626 B1 | * | 2/2002 | Nakaminami et al. ..... | 82/132 |

FOREIGN PATENT DOCUMENTS

| | | |
|---|---|---|
| EP | 0 305 767 A | 3/1989 |
| EP | 1 034 877 A | 9/2000 |
| JP | 2000-263358 A | 9/2000 |

* cited by examiner

*Primary Examiner*—Derris H. Banks
*Assistant Examiner*—Sara Addisu
(74) *Attorney, Agent, or Firm*—Smith Patent Office

(57) ABSTRACT

A clamping device for machine tools is disclosed that is capable of ensuring the clamping force for a tailstock while maintaining a small overall size of the device and a reduced number of parts. The tailstock (movable carriage) movably mounted on a fixed bed is clamped at a specified position to the fixed bed. A stationary rack (stationary fitting member) extending in a direction of movement is fixed to the fixed bed. A movable rack (movable fitting member) is provided on the tailstock so as to be movable in a direction transverse to the direction of movement of the tailstock. Wedge-shaped fitting surfaces are formed at mutually opposing portions of the stationary rack and the movable rack. The movable rack is driven to perform advance-and-retreat motions between a clamping position where the movable rack fits together with the stationary rack and an unclamping position where the clamping state is released.

10 Claims, 4 Drawing Sheets

CLAMPING DEVICE FOR MACHINE TOOLS

BACKGROUND OF THE INVENTION

1. Field of the Invention

The present invention relates to a clamping device for machine tools which have a movable carriage which is linearly movable on a fixed bed and which needs to be clamped to the fixed bed at a specified position during machining.

2. Discussion of the Related Art

In a lathe, for example, a headstock with a spindle fitted thereto is secured on one side of a fixed bed while a tailstock is provided linearly movable on the other side. A workpiece is retained between the tailstock and a chuck of the headstock to keep the workpiece subjected to machining. In this case, in order to prevent the workpiece from swaying, the tailstock is fixed to the fixed bed with a clamping device.

Japanese Patent Laid-Open Publication No. 2000-263358 discloses a clamping device disposed in a recessed portion of the fixed bed that extends along the direction of motion of the tailstock. A force is applied to the right and left inner walls of the recessed portion by means of a plurality of pistons arranged on the tailstock so that a movable rack fixed to the pistons is engaged with a stationary rack fixed to an inner wall of the recessed portion, thereby firmly positioning the tailstock.

With the adoption of the above-mentioned related art structure, the clamping force is applied to the right and left inner walls of the recessed portion by means of pistons to clamp the tailstock. This structure requires an increased number of pistons to ensure the fixing force, thereby causing an increase in the overall dimension and the number of parts of the clamping device.

SUMMARY OF THE INVENTION

The present invention has been proposed to overcome these drawbacks. An object of the invention is to provide a clamping device for machine tools which is capable of ensuring the fixing force for the tailstock while maintaining a compact device which has a reduced number of parts.

In order to achieve this and other objects of the present invention, a clamping device for a machine tool is provided, comprising a fixed bed; a movable carriage movably mounted on the fixed bed; a stationary fitting member fixed to the fixed bed and extending in a direction of movement of the movable carriage, the stationary fitting member having a wedge surface tilted downwardly; a movable fitting member provided on the movable carriage, the movable fitting member being movable between an extended position and a retracted position in a direction transverse to the direction of movement of the movable carriage, the movable fitting member further having a wedge surface complementary to the wedge surface of the stationary fitting member; and a driving mechanism for moving the movable fitting member between an extended position where the movable fitting member engages the stationary fitting member to clamp the movable carriage to the fixed bed and a retracted position where the movable fitting member is disengaged from the stationary fitting member to release the movable carriage.

It is desirable that the stationary fitting member and the movable fitting member in the present invention are a stationary rack and a movable rack with the teeth formed on the fitting surface of each member so that they engage with each other.

It is also desirable that the fixed bed has a recessed portion which receives a ball screw for moving the movable carriage, and the stationary rack is fixed to a stepped portion formed in a shoulder portion of the recessed portion.

According to the clamping device of the present invention, a wedge-shaped fitting surface is formed at each mutually opposed portion of the stationary fitting member and the movable fitting member so that fixed member, which is fixed to the fixed bed, and the movable fitting member, which is mounted on the movable carriage, are able to fit together and separate, by advancing and retreating movements of the movable fitting member. Therefore, the movable carriage can be reliably fixed to the fixed bed without a large increase in the force necessary to move the movable fitting member toward the fitting or clamping direction.

Further, by virtue of the wedging action of the wedge-shaped fitting surfaces of the stationary fitting member and the movable fitting member when they are fit together, the drive structure can be simplified since the movable fitting member is driven in advance and retreat motions by a simple mechanism. As a result, the device as a whole can be made compact and the number of parts involved can be reduced.

Rack teeth may be formed on the fitting surfaces of both the stationary rack and the movable rack. In this case, a fixing force caused by the engagement of both sets of rack teeth is added to the fixing force caused by fitting the wedge-shaped fitting surfaces to each other. Thus, the movable carriage can be reliably fixed to the fixed bed.

Further, a recessed portion may be formed at a shoulder of the recessed portion of the fixed bed. The shoulder portion includes a stepped portion having the stationary rack fixed thereto. A ball screw can be disposed in the recessed portion for moving the movable carriage in a manner known in the art. The stationary rack can be disposed by effectively using a free space while avoiding interference between the ball screw and the movable carriage. Thus, the overall structure of the device can be simplified.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Figure 1:
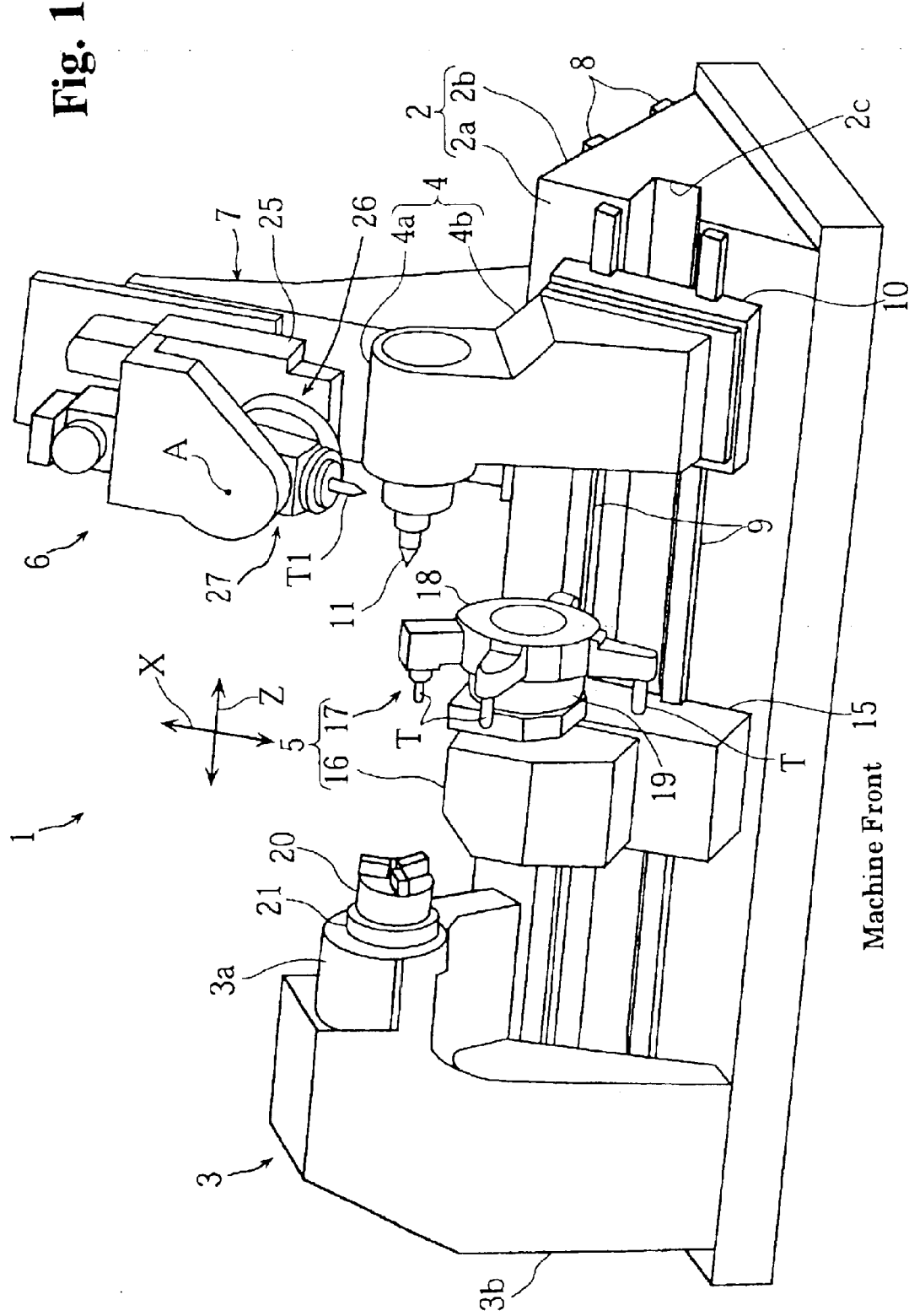
FIG. 1 is a perspective view of a combined machining lathe having a clamping device according to an embodiment of the present invention.
Figure 2:
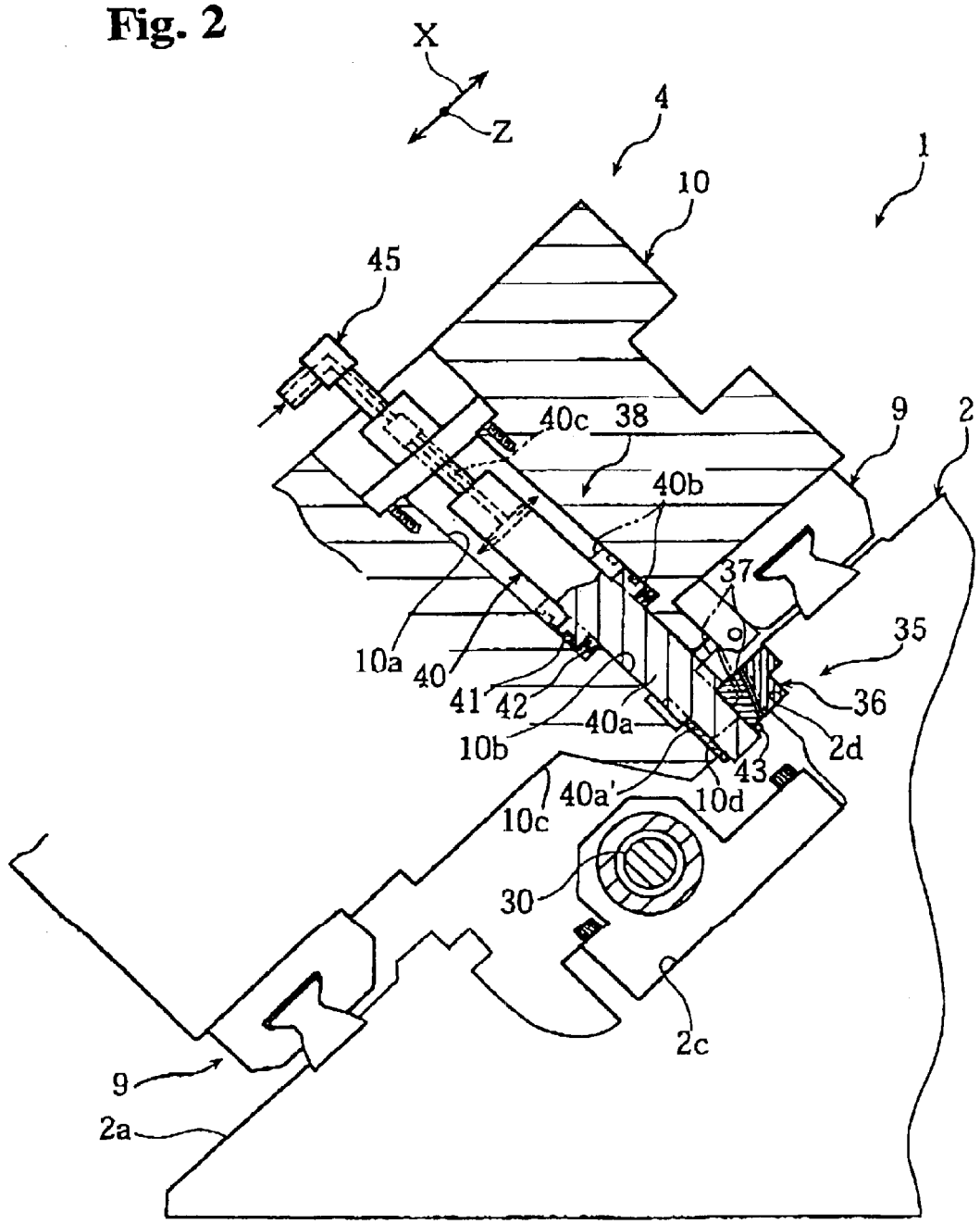
FIG. 2 is a side view, partially in section, of the clamping device according to the embodiment of FIG. 1 of the present invention.
Figure 3:
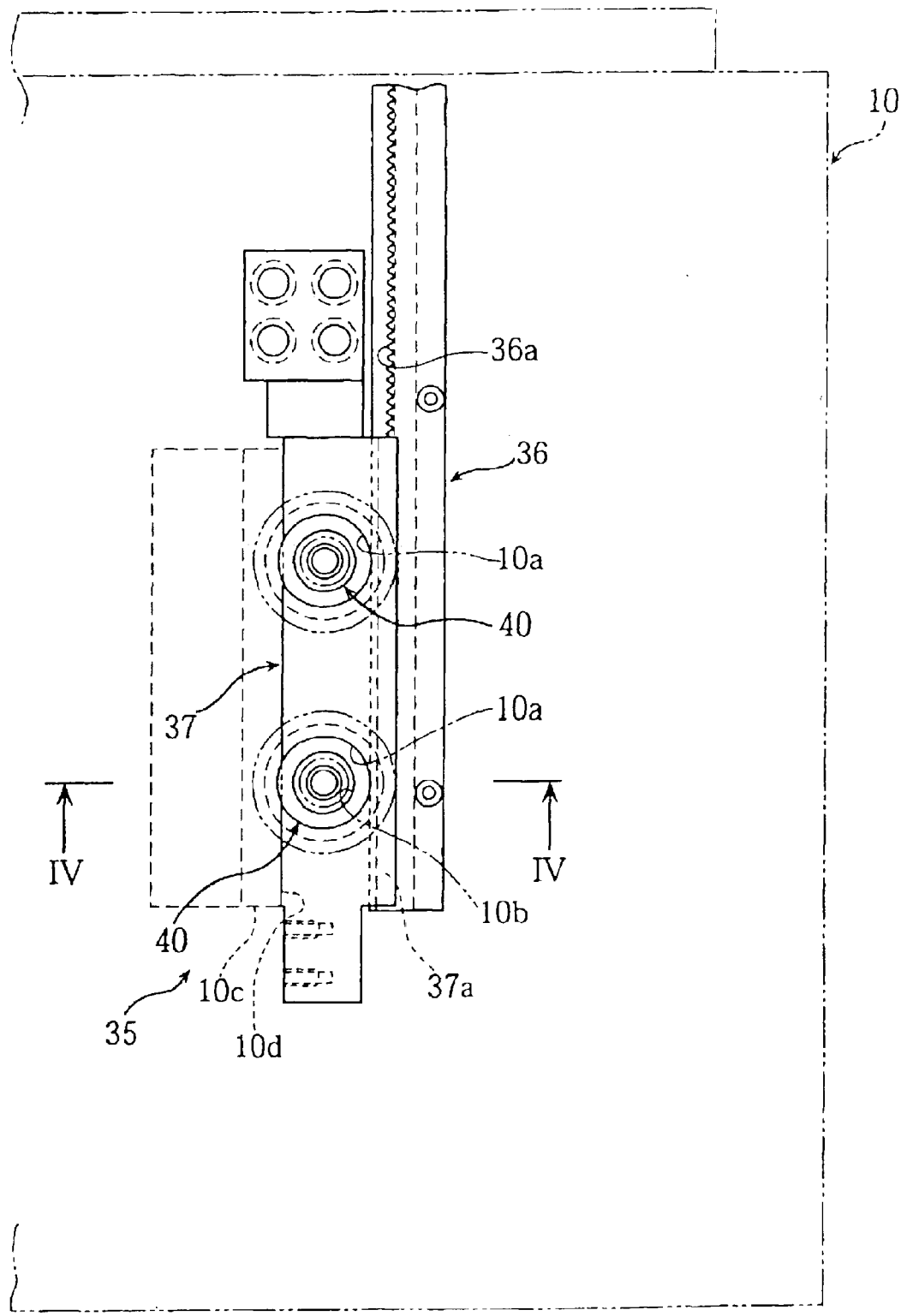
FIG. 3 is a plan view of the clamping device according to the present invention.
Figure 4:
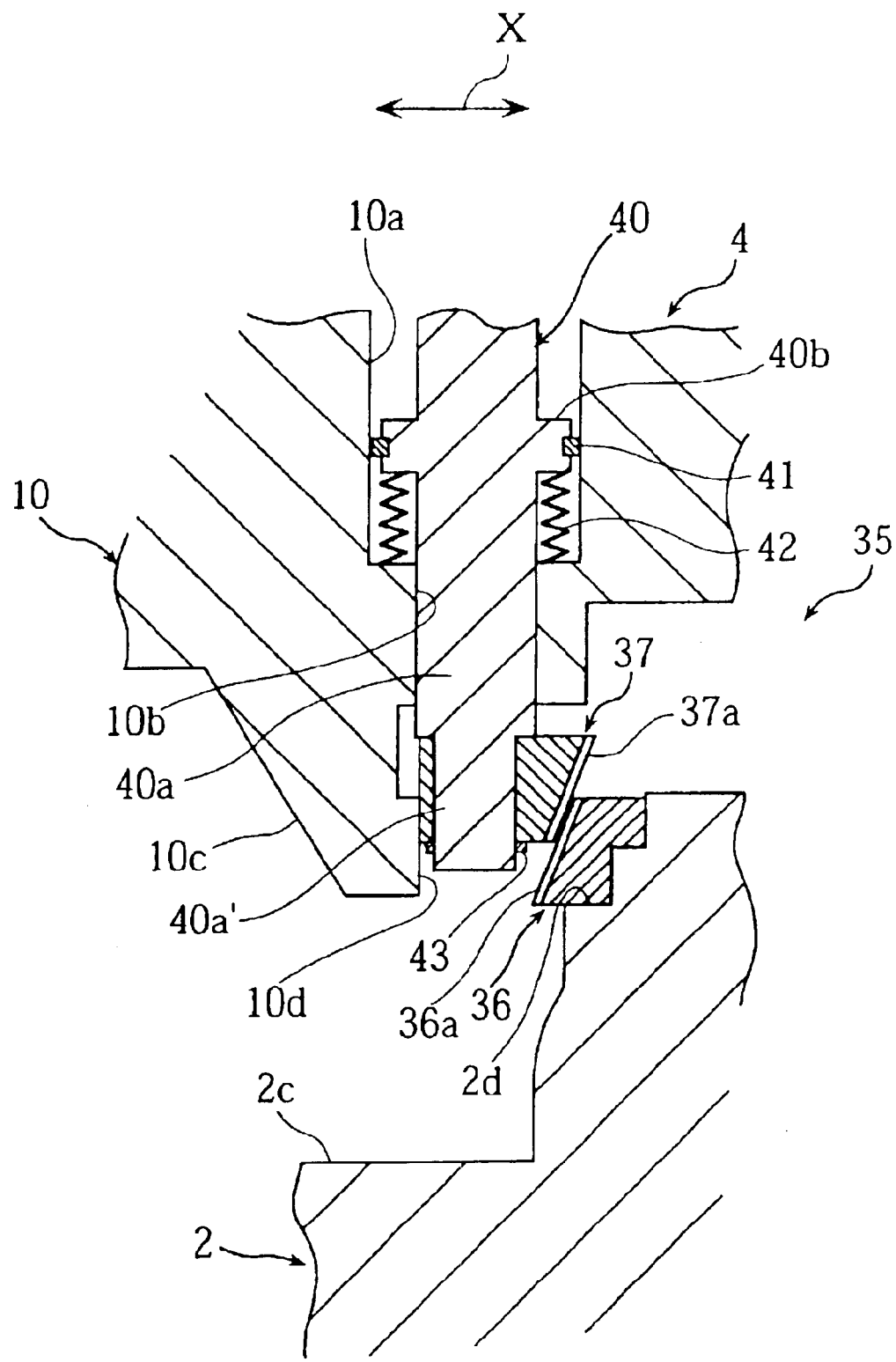
FIG. 4 is a cross sectional view of the clamping device taken along the line IV-IV of FIG. 3 according to the present invention.

Embodiments of the present invention are described below with reference to the accompanying drawings.

Referring to the figures, a combined machining lathe 1 has a fixed bed 2 which is formed into a triangular-prism shaped structure having two mounting surfaces including a forward-tilted sloping surface 2a and a rearward-tilted sloping surface 2b as can be seen in a perspective view shown in FIG.

1. As viewed from the machine front, a headstock 3 is disposed at a left-side longitudinal end portion of the forward-tilted sloping surface 2a of the fixed bed 2. A tailstock 4 is disposed on the right-side end portion. A lower tool rest 5 is disposed on the forward-tilted sloping surface 2a between the headstock 3 and the tailstock 4 while an upper tool rest 6 is disposed on the rearward-tilted sloping surface 2b.

The headstock 3 is composed of a spindle portion 3a for rotatably supporting a spindle 21 having a chuck 20 for grasping a workpiece, and a base portion 3b extending downwardly from the spindle portion 3a. The base portion 3b is fixed to the fixed bed 2.

Two guide rails 8 are disposed parallel to each other on the rearward-tilted sloping surface 2b of the fixed bed 2. A column 7 is supported, movably in the Z-axis direction, by the guide rails 8. The upper tool rest 6 is mounted, movably in the X-axis direction, on the column 7. This upper tool rest 6 is equipped with a support base 25 supported by the column 7 so as to be movable in the X-axis direction. A tool rest body 27 is supported by means of the support base 25 so that the tool rest body can be indexed and clamped at a desired angular position with respect to a pivot A through a rotational index unit 26. On this tool rest body 27, a tool T1 is changeably retained and driven into rotation by a built-in rotation drive unit (not shown).

Two guide rails 9 are disposed parallel to each other on the forward-tilted sloping surface 2a of the fixed bed 2, and a saddle 15 is supported by the guide rails 9 so as to be movable in the Z-axis direction. On this saddle 15, a lower tool rest 5 is mounted so as to be movable in the X-axis direction. The lower tool rest 5 includes a tool rest body 16 mounted on the saddle 15 so as to be movable in the X-axis direction, and a turret 17 mounted on the right-hand side face of the tool rest body 16. The turret 17 includes a turret head 18 having a plurality of tools T changeably retained on its outer periphery. The turret head 18 is supported by a rotational index base 19 capable of performing rotational indexing of the turret head. The turret 17 rotationally indexes and positions a required tool T to a desired machining position and clamps it to the machining position.

On the guide rails 9, a tailstock base 10 is mounted so as to be movable in the Z-axis direction, where the undersurface of the tailstock base 10 is generally parallel to the forward-tilted sloping surface 2a. The tailstock 4 is mounted on the tailstock base 10. The tailstock 4 has a tailstock portion 4a that supports a tailstock spindle 11 so that the tailstock spindle.11 can move forward or backward. The tailstock portion 4a is formed on a base portion 4b vertically fixed to the tailstock base 10. The axis line of this tailstock spindle 11 coincides with the axis line of the spindle 21.

A recessed portion 2c extending in the longitudinal direction is formed between the guide rails 9 of the forward-tilted sloping surface 2a of the fixed bed 2, and a ball screw 30 is rotatably disposed at a bottom wall of the recessed portion 2c. The ball screw 30 engages a nut portion (not shown) fixed to the tailstock base 10 so that a rotation of the ball screw causes the tailstock 4 to move in a linear motion either to the right or to the left.

A clamping device 35 comprises a prismatic stationary rack (stationary fitting member) 36 fixed on the fixed bed 2 and extending in the direction of the movement of the tailstock 4. A prismatic movable rack (movable fitting member) 37 is provided in a space between the fixed bed 2 and the tailstock 4 so as to be movable in the space. A cylinder mechanism (advance-and-retreat driving means) 38 is provided for driving the movable rack 37 into advance-and-retreat motions between a clamping position and an unclamping position.

The stationary rack 36 is fixed by means of bolts to a stepped portion 2d formed on the rear shoulder portion of the recessed portion 2c, so that the stationary rack 36 is blocked from moving rearwardly in the X-axis direction. A front side face of this stationary rack 36 in the X-axis direction is formed upward, i.e., in a wedge shape obliquely sloping with respect to a later-described advance-and-retreat moving direction of the movable rack 37, and rack teeth 36a are formed in the sloping surface (fitting surface).

A backup member comprises a pressing-and-supporting portion 10c that is formed as a protuberance protruding integrally on the undersurface of the tailstock base 10. In this pressing-and-supporting portion 10c is formed a pressing-and-supporting surface 10d confronting the stationary rack 36 with a specified gap therebetween, where the movable rack 37 is in sliding contact with the pressing-and-supporting surface 10d.

The movable rack 37 is disposed between the stationary rack 36 and the pressing-and-supporting portion 10c. The rear side face of the movable rack 37 constitutes a downward-tilted wedge surface so as to be parallel to the sloping surface of the stationary rack 36. In this sloping surface (fitting surface) are formed rack teeth 37a which engage with the rack teeth 36a. The front side-face of the movable rack 37 is in sliding contact with the pressing-and-supporting surface 10d, so that the movable rack 37 is blocked from moving forward in the X-axis direction, i.e., in the direction departing from the stationary rack 36.

The cylinder mechanism 38 is so designed as to make the movable rack 37 engage with the stationary rack 36, i.e. to be driven to advance or retreat between a clamping position where tension exists between the stationary rack 36 and the pressing-and-supporting portion 10c by the movable rack 37, and an unclamping position where the clamping is released. The cylinder mechanism 38 has a structure described below.

In the tailstock base 10 are formed a pair of cylinder holes 10a and a pair of smaller-diameter guide hole 10b adjacent thereto. The piston portion 40b and a rod portion 40a of a piston rod 40 are inserted into the cylinder holes 10a and the guide hole 10b respectively, so that the piston is slidably retained in the cylinder.

A lower end portion 40a' of the rod portion 40a is protruding from the lower surface of the tailstock base 10 so as to be placed within the recessed portion 2c. The movable rack 37 is fitted to the lower end portion 40a' and fixed by a lock member 43 to prevent the movable rack 37 from loosening and falling.

Further, sealing members 41 in sliding contact with the inner circumferential surfaces of the cylinder holes 10a are fitted to the piston portions 40b of the piston rod 40. Springs 42 are provided between the piston portion 40b and the bottom portions of the cylinder holes 10a for biasing the piston rod 40 in the unclamping direction.

Still further, an oil-pressure feed portion 45 is connected via an oil lead line 40c to the cylinder holes 10a for moving the movable rack 37 to the clamping position. An oil pressure fed to the oil-pressure feed portion 45 can pass from oil pressure feed portion 45 to the cylinder holes 10a through the oil lead line 40c to cause the piston rod 40 to go down. This moves the movable rack downward into engagement with the stationary rack 36, causing tension between the stationary rack 36 and the pressing-and-supporting portion 10c. As a result, the tailstock 4 is positioned and fixed to the fixed bed 2. When the oil pressure is released, the springs 42 push the piston rod 40 upward, releasing the clamping and causing the movable rack 37 to move up to the unclamping position.

According to the clamping device of this embodiment, the stationary rack 36 is fixed to the fixed bed 2. The pressing-and-supporting portion 10c is formed as a protuberance at the bottom of the tailstock base 10 so as to face the stationary rack 36. The wedge-shaped movable rack 37 is arranged to advance or retreat between the pressing-and-supporting portion 10c and the stationary rack 36. In the advanced position, the wedge-shaped fitting surface of the movable rack 37 fits together with the fitting surface of the stationary rack 36 while the wedge-shaped rack teeth 36a, 37a are engaged with each other. Thus, an additional fitting force can be provided between the stationary rack 36 and the pressing-and-supporting portion 10c by means of the movable rack 37, so that the tailstock 4 can be positioned reliably and using the engaging force between the rack teeth 36a, 37a and the aforementioned fitting force.

Further, in this embodiment, the wedge-shaped movable rack 37 is provided between the stationary rack 36 and the pressing-and-supporting portion 10c. Thus, the drive structure required can be simplified such that the movable rack 37 is driven into advance and retreat motions by a simple cylinder mechanism 38. As a result, the overall structure of the device can be simplified and the number of parts required can be reduced.

Further in this embodiment, the stepped portion 2d is formed on a shoulder portion of the recessed portion 2c of the fixed bed 2, where the ball screw 30 is disposed. Also, the stationary rack 36 is fitted and fixed to the stepped portion 2d. Thus, the stationary rack 36 can be effectively disposed by using a free space while avoiding interference between the ball screw 30 and the movable members. As a result, the whole device can be made more compact.

Although the above embodiment has been described for a case where the tailstock of a combined machining lathe is clamped, the clamping device of the present invention is not limited to this embodiment but is applicable also to the clamping mechanism for the headstock, the movable table, the workpiece changer pallet or other movable carriages.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2002-195637 filed Jul. 4, 2002 is hereby incorporated by reference.

What is claimed is:

1. A clamping device for a machine tool, comprising:
   a fixed bed having a mounting surface;
   a movable carriage movably mounted on the mounting surface;
   a stationary fitting member fixed to the fixed bed and having a wedge surface extending in a direction of movement of the movable carriage;
   a movable fitting member provided on the movable carriage, the movable fitting member being movable in a direction substantially perpendicular to the mounting surface, the movable fitting member further having a wedge surface which is substantially parallel to the wedge surface of the stationary fitting member; and
   a driving mechanism for moving the movable fitting member between an extended position where the movable fitting member engages the stationary fitting member to clamp the movable carriage to the fixed bed and a retracted position where the movable fitting member is disengaged from the stationary fitting member to release the movable carriage.

2. The clamping device for a machine tool according to claim 1, wherein the stationary fitting member and the movable fitting member are a stationary rack and a movable rack, respectively, each having rack teeth formed on the wedge surface for engagement with each other.

3. The clamping device for a machine tool according to claim 2, wherein the fixed bed has a recessed portion in which a ball screw for moving the movable carriage is disposed, and the stationary rack is fixed to a stepped portion formed on a shoulder portion of the recessed portion.

4. The clamping device for a machine tool according to claim 1, wherein the driving mechanism is a cylinder mechanism.

5. The clamping device for a machine tool according to claim 4, wherein the cylinder mechanism is an oil cylinder having a piston-return spring.

6. The clamping device for a machine tool according to claim 1, wherein the movable carriage is provided with a backup member for contacting a front side face of the movable fitting member which is on an opposite side of the movable fitting member from the wedge surface.

7. A clamping device for a machine tool, comprising:
   a movable carriage movably mounted on a fixed bed and clamped to a specified position on the fixed bed;
   a stationary fitting member fixed to the fixed bed and extending in a direction of movement of the movable carriage, the stationary fitting member having a wedge surface tilted downwardly;
   a movable fitting member provided on the movable carriage, the movable fitting member being movable between an extended position and a retracted position in the direction transverse to the direction of movement of the movable carriage, the movable fitting member further having a wedge surface complementary to the wedge surface of the stationary fitting member;
   a driving mechanism for moving the movable fitting member between an extended position where the movable fitting member engages the stationary fitting member to clamp the movable carriage to the fixed bed and a retracted position where the movable fitting member is disengaged from the stationary fitting member to release the movable carriage; and
   a backup member provided at the bottom of the movable carriage for contacting a front side face of the movable fitting member which is on an opposite side of the movable fitting member from the wedge surface.

8. A machine tool comprising:
   a fixed bed having a mounting surface and a recessed portion in which a ball screw for moving a movable carriage is disposed, wherein the movable carriage is movably disposed on the mounting surface by a means for mounting the movable carriage to the mounting surface;
   a stationary fitting member fixed to the fixed bed and extending in a direction of movement of the movable carriage, the stationary fitting member being fixed to the fixed bed at a shoulder of the recessed portion of the fixed bed and having a wedge surface;

a movable fitting member provided on the movable carriage, the movable fitting member being movable in a direction substantially perpendicular to the mounting surface of said fixed bed, the movable fitting member further having a wedge surface extending parallel to the wedge surface of said stationary fitting member; and a driving mechanism having a longitudinal axis for moving the movable fitting member between an extended position where the movable fitting member engages the stationary fitting member to clamp the movable carriage to the fixed bed and a retracted position where the movable fitting member is disengaged from the stationary fitting member to release the movable carriage, wherein the movable fitting member is disposed such that the wedge surface of the movable fitting member is disposed to form an acute angle with the longitudinal- axis of the driving mechanism; and a backup member provided at the bottom of the movable carriage for contacting a front side face of the movable fitting member which is on an opposite side of the movable fitting member from the wedge surface.

9. The machine tool according to claim 8, wherein the stationary fitting member and the movable fitting member are a stationary rack and a movable rack, respectively, each having rack teeth formed on the wedge surface for the engagement with each other.

10. The machine tool according to claim 8, wherein the driving mechanism is a cylinder mechanism.

* * * * *